United States Patent [19]

Herter

[11] Patent Number: 4,517,016

[45] Date of Patent: May 14, 1985

[54] METHOD FOR PREPARING A LOW RESIDUAL ALLOY STEEL CHARGE FROM SCRAP METAL

[76] Inventor: Carl J. Herter, 1638 Walnut St., Allentown, Pa. 18102

[21] Appl. No.: 529,290

[22] Filed: Sep. 6, 1983

[51] Int. Cl.³ .............................................. C22B 1/00
[52] U.S. Cl. ...................................... 75/28; 75/44 S; 75/63; 75/256
[58] Field of Search ...................... 75/63, 28, 44 S, 256

[56] References Cited

U.S. PATENT DOCUMENTS 3,669,644  6/1972  Sato ......................................... 75/63

FOREIGN PATENT DOCUMENTS 124014  4/1947  Australia ................................. 75/63

Primary Examiner—Melvyn J. Andrews
Attorney, Agent, or Firm—Ruth Moyerman

[57] ABSTRACT

A process is disclosed for treating iron or steel base scraps such as automobile scrap vehicles to reduce the alloy content of the scrap to a sufficient level to permit the scrap to be reprocessed in an electric furnace. The process treats the entire scrap vehicle. In the process, the vehicle is first shredded, or chopped, to a manageable size which is then utilized as a charge to a kiln. The kiln is maintained as an oxidizing atmosphere at about 1700 degrees F. at the feed end to cause zinc oxide and cuprite to be formed, which are then removed as dust. As the charge moves through the kiln, the kiln atmosphere is gradually changed from oxidizing, through neutral, to reducing, and the kiln temperature is raised to about 1900 degrees F. at the discharge end. These conditions cause formations of the metallic form of copper, nickel, chromium, lead and zinc as a brittle scale. Aluminum forms a melt which adheres to the scale. An autogenous mill, where the feed particles are tumbled against each other, descales them. The metallic scale produced thereby is removed. The feed remaining has now had sufficient residual alloys removed to allow its use as a direct charge to an electric furnace.

11 Claims, 1 Drawing Figure

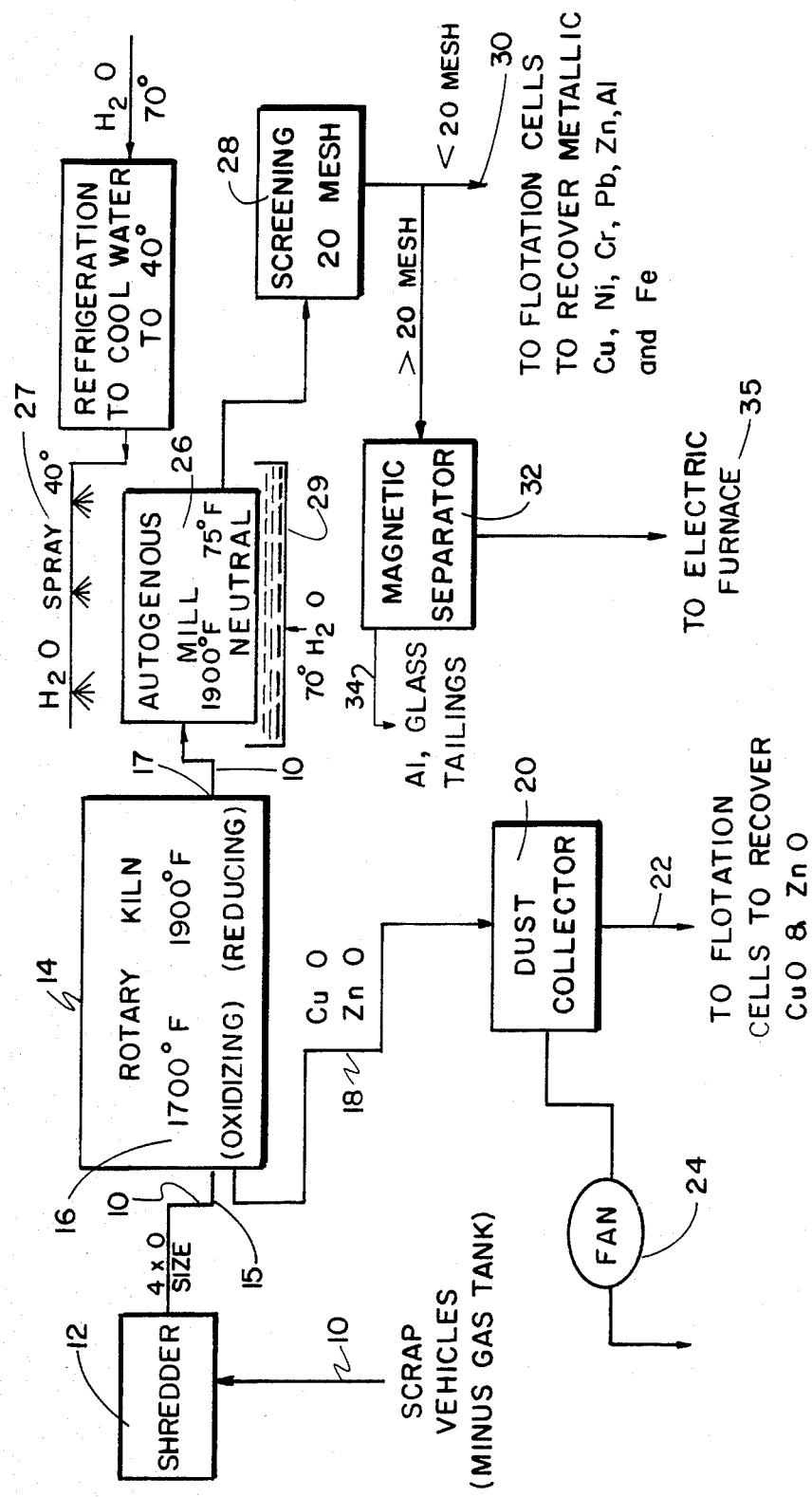
FIG. I

METHOD FOR PREPARING A LOW RESIDUAL ALLOY STEEL CHARGE FROM SCRAP METAL

BACKGROUND OF THE INVENTION

1. Field of the Invention

This invention relates to metalurgy, and more particularly to iron and steel recovery from scrap metal.

2. Description of the Prior Art

At the time an automobile is no longer a means of conveyance, or a source of spare parts, it becomes a disposal problem. Automobile graveyards are becoming more prevalent and the government has expressed an interest in removing this "pollution problem".

The junked automobile carcasses would have an application in steelmaking process if a low cost method could be found to remove the residual alloy content of copper, nickel, chromium, lead, zinc and aluminum to leave a low residual alloy steel feed for, primarily, electric furnaces.

Some prior art is known. Senior et al, in U.S. Pat. No. 3,206,299, discloses a conventional low grade ore reducing kiln process which includes a pretreatment step of oxidizing for purposes of dehydration and removal of volatiles. This is followed by, generally, standard reduction process techniques.

Rhinehart, in U.S. Pat. No. 4,014,681, discloses an energy recycling process to be used with automobile scrap. In the Rhinehart process, a totally stripped vehicle body—that is, one stripped of alternators, radiators, generators, starters, voltage regulators, transmissions, carburetors, glass, etc.—is moved by conveyor into a cupola where it is melted. Carbon electrodes are required to generate the necessary 3,200 degree F. temperature. The thrust of this patent is the use of heat generated in recycling to, for example, preheat the charge. The charge is drawn off molten, in layers if possible.

Evans et al, in U.S. Pat. No. 4,200,262, discloses a method and apparatus for removing combustible material from metal scrap. Evans characterizes his apparatus as a rotating retort and its use is for burning combustibles such as oil from scrap metal such as turnings, chips, shearings, punchings, and other similar materials which tend to include a coating of oil which must be removed before reclaiming. In the Evans apparatus, temperatures of 50 to 500 degrees F. are used in an oxidizing atmosphere through which the material moves, conveyed forward by the rotating retort.

None of these references deal with a high alloy scrap which removes the alloys in a non-molten atmosphere. None will accomodate an entire vehicle, bumper, tires, etc. and many prior art solutions are totally noneconomical because of high energy demands of the process as would be needed for the high temperatures utilized in, for example, Rhinehart.

SUMMARY OF THE DISCLOSURE

The prior art problems are solved by the process of this invention wherein vehicle scrap (minus only the gas tank for safety reasons) is first shredded to a manageable size, and thereafter fed into a rotary kiln. The kiln feed end is maintained at about 1700 degrees F. and an oxidizing atmosphere is provided. At this temperature, and in an oxidizing atmosphere, the zinc is fumed to zinc oxide dust. Likewise, copper is also oxidized to cuprite—a red powder form. The oxide laden dust produced may be removed in conventional dust collectors and may be recovered by standard flotation techniques.

As the feed continues through the kiln, the atmosphere is changed to reducing and the temperature adjusted to not less than about 1900 degrees F. to cause metallic scale to form on the feed particles. The scale is primarily copper, nickel, chromium, lead, zinc and melted aluminum.

As the feed discharges, it proceeds directly, without cooling, to a mill, preferably an autogenous mill, where lifters lift, drop and tumble the particles against each other to descale them. The metallic scale is brittle and this milling process step effectively cleanses the ferrous metal of surface alloy scale. The atmosphere must be neutral to prevent reoxidizing of the now reduced metals. The autogenous mill is cooled by, preferably refrigerated, water. The mill may be immersed in a water trough to effect this cooling, or water may be sprayed on the mill, or both.

The metallic scale dust formed is removed by screening and recovered by flotation on other conventional means. The feed is now magnetically separated to remove aluminum, glass and tailings. The material remaining is sufficiently reduced in residual alloy content to permit its use as a charge for electric steel making furnaces.

It is, therefore, an object of this invention to provide a process for recycling automobile scrap with greater cost effectiveness than is now possible.

It is another object of this invention to effect the aforementioned cost savings by a process which is faster than prior art processes by providing a continuous production line for producing electric furnace charge.

It is yet another object of this invention to provide an auto scrap charge for electric furnaces which, by virtue of its lower alloy or non-ferrous component, requires less retention in the electric furnace and less use of lime.

It is also an object of this invention to provide a vehicular scrap process which is ecologically advantageous because the entire vehicle is processed and heretofore waste product, such as automobile oil, carpets and tires, is utilized in the process, thereby obviating a disposal problem of open burning in junkyards.

It is still another object of this invention to provide a process which is less expensive by providing a combination oxidizing and reducing kiln operation.

These and other objects will be more readily ascertainable to one skilled in the art from a consideration of the following Figure, descriptions and exemplary embodiments.

BRIEF DESCRIPTION OF THE DRAWING(S)

The drawing illustrates a flow chart of the process of this invention.

DETAILED DESCRIPTION OF THE PREFERRED EMBODIMENT(S)

Referring now to the drawing, vehicle scrap 10 is prepared as feed by first removing the gas tank which may be accomplished by cutting the two straps that hold the tank in place. By then depressing the accelerator, residual gas may be run out of the line and the carburetor. The entire scrap vehicle, minus the tank but including the copper wiring, copper tubing, engine, transmission, rear end, alternator, generator, starter, radiator, tires, wheels, battery, bumpers, seating and carpeting are left remaining as part of scrap vehicle 10 which then enters shredder 12 as feed.

Shredder 12 may be of the conventional grinding mechanism type and grinds scrap 10 to a manageable average size, preferably about 4×0. Scrap 10 is then moved as feed to rotary kiln 14. This conveyance may be by, for example, a conventional pan feeder which is represented at 15.

Rotary kiln 14, which may be a standard kiln such as a Lurgi type, has feed temperatures at the feed end of from about 1650 degrees F. to about 1700 degrees F. and the atmosphere is kept as an oxidizing atmosphere. This atmosphere will cause the copper present in the scrap to be oxidized to cuprite—a red powder—and the zinc to zinc oxide indicated at 18 which is also a powder. The cuprite and zinc oxide powder 18 may be collected at dust collector 20 and removed thereafter by flotation cells as indicated at 22 or other conventional means to separate and recover the cuprite and the zinc oxide. Removal of powder 18 from kiln 14 is aided by the use of an induced draft fan 24.

Referring back to rotary kiln 14, feed end 16 of kiln 14 is run in an oxidizing atmosphere from between about 1650 degrees F. to about 1700 degrees F., with 1700 degrees F. being preferred. As feed 10 moves along kiln 14, the temperature is gradually raised to from about 1700 degrees F. to about 2100 degrees F. with 1900 degrees F. being preferred. Along the kiln length, the atmosphere is changed, first to neutral and thereafter gradually to a reducing atmosphere at discharge end 17.

It has been found that these temperatures and time will result in a feed temperature of above about 1650 degrees F. The reducing atmosphere at the kiln end will cause reduction of oxide present to the metallic form of the metal in the case of copper, nickel, chrome, lead, zinc and iron. Aluminum forms a melt which adheres to the scale. Excess scale, that is scale above about 2.5 weight percent, is not formed during the process at the preferred time and temperature. Excess scale formation is undesirable because it reduces the amount of final product because iron, or ferrous alloys, becomes intermixed with the scale.

As feed 10 leaves rotary kiln 14, it proceeds to autogenous mill 26. The feed may be transported from kiln 14 to mill 26 by a bifurcated chute if it is desired to remove samples for testing. Autogenous mill 26 functions to cause the scrap to tumble and fall against itself for the purpose of removing the now-formed brittle coatings of metallic copper, nickel, chrome, etc. which adhere to the scrap. Feed 10 proceeds to mill 26 without intermittent cooling and thus mill 26 would be heated by feed 10. Initial mill temperatures may be as high, therefore, as 1900 degrees F. Spray cooling by water 27, or an immersion bath of mill 26, shown at 29, can be utilized to cool the mill. Autogenous mill 26 is preferably fitted with lifters as is conventional in this art, and the lifters are utilized to pick up feed 10, dropping it on itself to achieve the cleaning of the metal alloys from the remaining scrap which is now largely iron in composition as will be seen in the accompanying tables. Tumbling may also be employed to achieve this separation of nonferrous metals from feed 10.

Following treatment in autogenous mill 26, feed 10 progresses through screen 28 at 20 mesh, then through a magnetic separator 32 which sorts aluminum, glass and nonmagnetic tailings from feed 10 as shown at 34. Screening 28 may be performed satisfactorily at about 20 mesh. Material of less than 20 mesh, e.g. the aforementioned metals, may be separated by flotation cells, or other conventional means to recover the metallic copper, nickel, chrome, lead, zinc, iron and aluminum as indicated at 30. Material of greater than 20 mesh is now sufficiently reduced in alloy content so as to be suitable for use as a direct charge in an electric steel furnace 35.

The following three tables—I, II and III—illustrate the advantages obtained by utilizing the process of this invention. The data appearing in these tables was obtained by a laboratory simulation of the process of this invention in which column I material was derived by fragmentizing scrap automobiles minus only the engine, transmission, rear end and seats.

TABLE I

REMOVAL OF COPPER FROM SCRAP

| | | "As Is" Scrap | | | "Roasted and Cleaned" Scrap | | | |
|---|---|---|---|---|---|---|---|---|
| | 1 | 2 Weight | 3 Cu Assay | 4 Distribution | | 5 Cu Assay | 6 Distribution | | 7 Removal |
| | Scrap Size | (%) | (%) | (#Cu/ton scrap) | (%) | (%) | (#Cu/ton scrap) | (%) | (%) |
| A | ¼" × 0 mix | 2.8 | .217 | .1215 | 1.8 | .05 | .0280 | .8 | 77.0 |
| B | ½" × ¼" mix | 3.2 | .096 | .0614 | .9 | .06 | .0384 | 1.1 | 37.4 |
| C | 1" × ½" mix | 10.0 | .400 | .8000 | 11.7 | .12 | .2400 | 7.0 | 70.0 |
| D | Bumpers | 3.0 | .930 | .5580 | 8.1 | .06 | .0360 | 1.0 | 93.6 |
| E | Stainless Steel Trim | 1.0 | .591 | .1182 | 1.7 | .15 | .0300 | .9 | 74.6 |
| F | Copper Wire | 0.2 | 21.602 | .8641 | 12.6 | 12.10 | .4840 | 14.0 | 44.0 |
| G | Springs, Nuts & Bolts | 4.1 | 1.971 | 1.6162 | 23.6 | 1.30 | 1.0660 | 30.9 | 34.0 |
| H | Fenders, Rocker Panels, Light Strips and Quarter Panels | .7 | .263 | .1946 | 2.8 | .12 | .0888 | 2.6 | 54.4 |
| I | Sub Total (Calc.) | 28.0 | .774 | 4.3340 | 63.2 | .359 | 2.0112 | 58.3 | 53.6 |
| J | +1" residue | 2.0 | .175 | 2.5200 | 36.8 | .10 | 1.4440 | 41.7 | 42.7 |
| | TOTAL (CALC.) | 100.0 | .343 | 6.8540 | 100.0 | .173 | 3.4552 | 100.0 | 49.6 |

TABLE II

REMOVAL OF CHROMIUM FROM SCRAP

| | | "As Is" Scrap | | | | "Roasted and Cleaned" Scrap | | |
|---|---|---|---|---|---|---|---|---|
| | | 2 | 3 | 4 | | 5 | 6 | 7 |
| 1 | | Weight | Cr Assay | Distribution | | Cr Assay | Distribution | Removal |
| | Scrap Size | (%) | (%) | (#Cr/ton scrap) | (%) | (%) | (#Cr/ton scrap) | (%) | (%) |
| A | ¼" × 0 mix | 2.8 | .100 | .0560 | 1.0 | .04 | .0224 | .8 | 60.0 |
| B | ½" × ¼" mix | 3.2 | .129 | .0826 | 1.5 | .04 | .0256 | 1.0 | 69.0 |
| C | 1" × ½" mix | 10.0 | .240 | .4800 | .9 | .03 | .0600 | 2.2 | 87.5 |
| D | Bumpers | 3.0 | .480 | .2880 | 5.2 | .02 | .0120 | .4 | 95.8 |
| E | Stainless Steel Trim | 1.0 | 16.400 | 3.2800 | 59.6 | 10.40 | 2.0800 | 76.0 | 36.6 |
| F | Copper Wire | 0.2 | .030 | .0012 | .02 | .01 | .0004 | .01 | 66.7 |
| G | Springs, Nuts & Bolts | 4.1 | .334 | .2739 | 5.0 | .09 | .0738 | 2.7 | 73.0 |
| H | Fenders, Rocker Panels, Light Strips and Quarter Panels | 3.7 | .750 | .5550 | 10.1 | .04 | .0296 | 1.1 | 94.7 |
| I | Sub Total (Calc.) | 28.0 | .896 | 5.0167 | 83.3 | .411 | 2.3038 | 84.2 | 54.1 |
| J | +1" residue | 72.0 | .064 | .9216 | 16.7 | .03 | .4320 | 15.8 | 53.1 |
| | TOTAL (CALC.) | 100.0 | .297 | 5.9383 | 100.0 | .137 | 2.7358 | 100.0 | 53.9 |

TABLE III

REMOVAL OF NICKEL FROM SCRAP

| | | "As Is" Scrap | | | | "Roasted and Cleaned" Scrap | | |
|---|---|---|---|---|---|---|---|---|
| | | 2 | 3 | 4 | | 5 | 6 | 7 |
| 1 | | Weight | Ni Assay | Distribution | | Ni Assay | Distribution | Removal |
| | Scrap Size | (%) | (%) | (#Ni/ton scrap) | (%) | (%) | (#Ni/ton scrap) | (%) | (%) |
| A | ¼" × 0 mix | 2.8 | .050 | .0280 | .6 | .040 | .0224 | .9 | 20.0 |
| B | ½" × ¼" mix | 3.2 | .100 | .0640 | 1.4 | .060 | .0384 | 1.6 | 40.0 |
| C | 1" × ½" mix | 10.0 | .197 | .3940 | 8.9 | .130 | .2600 | 11.0 | 34.5 |
| D | Bumpers | 3.0 | 1.200 | .0720 | 16.23 | .030 | .0180 | .8 | 97.5 |
| E | Stainless Steel Trim | 1.0 | .670 | .1340 | 3.0 | .400 | .0800 | 3.4 | 40.3 |
| F | Copper Wire | 0.2 | 2.670 | .1068 | 2.4 | 1.600 | .0640 | 2.7 | 40.1 |
| G | Springs, Nuts & Bolts | 4.1 | .280 | .2296 | 5.2 | .070 | .0574 | 2.4 | 75.0 |
| H | Fenders, Rocker Panels, Light Strips and Quarter Panels | 3.7 | .217 | .1586 | 3.6 | .130 | .0962 | 4.1 | 39.3 |
| I | Sub Total (Calc.) | 28.0 | .328 | 1.1870 | 41.6 | .114 | .6364 | 26.9 | 65.2 |
| J | +1" residue | 72.0 | .179 | 2.5776 | 58.4 | .120 | 1.7280 | 73.1 | 33.0 |
| | TOTAL CALC.) | 100.0 | .221 | 3.7646 | 100.0 | .118 | 2.3644 | 100.0 | 46.6 |

The actual material used in the experiment was purchased by the barrel from an auto scrap operation. The sample weight for roasting tests ranged from 5 grams to 60 grams. An average of ten samples were tested in each experiment. A tube furnace was used. The oxidizing atmosphere was air and the test periods lasted from about ten minutes to about an hour for the oxidizing phase. Nitrogen was used as the neutral atmosphere and a carbon monoxide/hydrogen mixture was used for reducing. Reducing time varied from about 40 to 50 minutes. Thus, it was found that bumpers and stainless trim required the highest temperature and longest retention time which was 1900 degrees F. and 60 minutes roasting time.

The experiment was conducted by first visually sorting the material to provide the components listed in lines D-H. Then, the remainder was screened to provide screen sizes as shown in lines A-C. Lastly, remaining oversized, e.g. +1, size mix is shown in line J. Columns 2-7 show data derived from the test. Line J figures are mathmatically derived residue figures.

Table I contains data on the removal of copper from column 1 material. Table I refers to components of vehicular scrap under the heading "Scrap Type" in both "As Is" scrap, by which is meant scrap as screened and separated as previously described and then tested for initial copper content chemically by standard solution analysis. "Roasted and Clean Scrap" refers to low residual alloy charge produced by the process of this invention as previously described and which was also analyzed by chemical tests. Reading down column 1, lines A-C refer to varying size material, e.g. less than one-fourth (¼) inch up to one inch, and the results demonstrate that copper can be reduced by up to about 77% in this ¼×0 size range material. Lines D-H refer to components of automobiles which have particularly high alloy, e.g. non-ferous, content and the results demonstrate removal of copper from these components as shown in column 7 of from about an average of 34% to about 94%. Line I contains subtotals of Columns 1-7. Line J gives calculated residue figures based on weight of original sample. Overall, Table I data demonstrates that the process of this invention can be expected to remove about 49% of the copper present in the scrap.

Table II, column 1, lines A-J, refer to the same components explained with reference to Table I after being processed by the method of this invention as it relates to the removal of chromium from scrap. The data in Table II shows an average 53.9% of chrome removed from the auto scrap, bumpers being a representative sample had 95.8% of the chrome removed in the test.

Table III contains data demonstrating nickel removal from scrap treated according to the process of this invention and with reference to the same column 1 materials. It may be seen in Table III that an average of 46.6% of the total nickel was removed, and bumpers once again had a high, i.e. 97.5%, removal efficiency.

In practicing the process of this invention, it should be noted that the following parameters are critical. Zinc is removed from the galvanized car parts by maintaining the temperature at the feed inlet above 1650 degrees F. Temperatures below this form a wetted zinc coating that adheres to the scrap feed surface. It is also critical that the furnace feed end atmosphere be oxidizing. These conditions, which are critical for zinc, are sufficient to also remove copper which is not as difficult to process as zinc.

The process must be operated in the reducing atmosphere step at the discharge end of from about 1800 degrees F. to about 2100 degrees F. It has been found that 1900 degrees F. is the preferred temperature because some of the trim material is made of laminates and heat breaks the metallic bond at 1900 degrees F.

While not critical, a feed size of 4×0 performs best, probably because of a combination of handling considerations and the need to bring the feed up to near kiln temperatures. Also, a small feed size increases the surface area and therefore reduces retention time and allows use of a smaller size kiln.

Having now illustrated and described my invention, it is not intended that such description limit this invention, but rather that this invention be limited only by a reasonable interpretation of the apended claims.

What is claimed is:

1. A method of preparing a low residual alloy for steel charge from steel and iron scrap metal containing at least one nonferrous metal selected from the group consisting of copper, nickel, lead, chromium, zinc and aluminum as contaminents comprising:
    (a) introducing said scrap into a feed end of a three zone rotary or the like kiln, said zone's coexisting simultaneously in said kiln, said kiln's feed end zone having an oxidizing atmosphere and a temperature of not less than about 1650 degrees F. to oxidize zinc and copper present in said scrap to their respective oxides and producing thereby an oxide laden dust;
    (b) removing said oxide laden dust from said kiln;
    (c) advancing said charge from said feed end of said kiln to said kiln's midsection and therein at said kiln's midsection causing said zone atmosphere to change from said oxidizing atmosphere to a neutral atmosphere and thereafter advancing said charge from said midsection of said kiln to said kiln's exit end and therein at said kiln's exit end zone causing said atmosphere to change from said neutral atmosphere to a reducing atmosphere, and raising said kiln temperature in said area of reducing atmosphere to not less than about 1800 degrees F. to induce brittle metallic scale formation of copper, nickel, lead, chromium, zinc and wherein only aluminum forms a melt while simultaneously reducing iron oxides formed during the oxidizing step to metallic iron scale; and,
    (d) mechanically separating and removing said scale from said feed to leave a ferrous based scrap metal feed with lowered nonferrous metal contamination suitable for use as a charge in a steel making furnace.

2. The method according to claim 1 wherein said scrap metal feed is derived from scrap vehicles.

3. The method according to claim 2 wherein said feed is of generally average 4×0 mesh size.

4. The method according to claim 1 wherein said kiln is a rotary kiln.

5. The method according to claim 1 wherein said oxide laden dust of step (b) is removed from said kiln by collection in a dust collector and is thereafter separated into metal components by flotation.

6. The method according to claim 1 wherein said separating of step (d) is by autogenous milling.

7. The method according to claim 1 wherein said removing scale of step (d) is by screening and magnetic separation.

8. The method according to claim 7 wherein said process further comprises recovering said metal scale screenings.

9. The method according to claim 7 wherein said screening of step (d) utilizes about a 20-mesh screen.

10. The method according to claim 8 wherein recovery of said scale screenings is by flotation.

11. A method of preparing a low residual alloy for steel charge from scrap metal vehicles containing at least one various nonferrous metal selected from the group consisting of copper, nickel, lead, chromium, zinc and aluminum as contaminents comprising:
    (a) subjecting said vehicle to mechanical shredding to produce a generally uniform particle feed size of about 4×0 mesh size;
    (b) introducing said feed into a feed end of a three zone rotary or the like kiln, said zones coexisting simultaneously, said kiln's feed end zone having an oxidizing atmosphere and a temperature of not less than about 1650 degrees F. to oxidize zinc and copper present in said scrap to their respective oxides and producing thereby an oxide laden dust;
    (c) removing said oxide laden dust from said kiln;
    (d) advancing said charge from said feed end of said kiln to said kiln's midsection and therein at said kiln's midsection causing said zone atmosphere to change from said oxidizing atmosphere to a neutral atmosphere and thereafter advancing said charge from said midsection of said kiln to said kiln's exit end and therein at said kiln's exit end zone causing said atmosphere to change from said neutral atmosphere to a reducing atmosphere, and raising said kiln temperature in said area of reducing atmosphere to not less than about 1900 degrees F. to induce brittle metallic scale formation of copper, nickel, lead, chromium, zinc and wherein only aluminum forms a melt while simultaneously reducing iron oxides formed during the oxidizing step so that the loss of ferrous content of said feed is less than about 2.5 weight percent; and,
    (e) separating said scale from said feed by autogenous milling, screening at about 20 mesh and magnetic separation to leave a scrap metal feed suitable for use as a charge in a steel making furnace and recovering said scale as metallic screenings.

* * * * *

UNITED STATES PATENT AND TRADEMARK OFFICE
CERTIFICATE OF CORRECTION

PATENT NO. : 4,517,016
DATED : May 14, 1985
INVENTOR(S) : Carl J. Herter

It is certified that error appears in the above-identified patent and that said Letters Patent are hereby corrected as shown below:

In Table I, H-2 is printed as ".7" -- it should be "3.7"

In Table I, J-2 is printed as "2.0" -- it should be "72.0"

In Table III, D-4(%) is printed as "16.23" -- it should be "16.3"

Signed and Sealed this

Tenth Day of September 1985

[SEAL]

Attest:

DONALD J. QUIGG

*Attesting Officer*   Acting Commissioner of Patents and Trademarks - Designate